United States Patent [19]

Sapiro

[11] Patent Number: 5,017,748
[45] Date of Patent: May 21, 1991

[54] FLOAT SWITCH WITH BUOYANT HOUSING AND SWITCH OPERATING MEANS WITHIN THE HOUSING

[76] Inventor: Andrew J. Sapiro, P.O. Box 282, Rayton, South Africa, 1001

[21] Appl. No.: 387,624

[22] Filed: Jul. 31, 1989

[30] Foreign Application Priority Data

Aug. 2, 1988 [ZA] South Africa ............... 88/5663

[51] Int. Cl.⁵ .................................. H01H 35/18
[52] U.S. Cl. ........................... 200/84 C; 73/313; 200/61.52; 340/623
[58] Field of Search ............. 73/308, 313, 318, 322.5; 340/623, 624, 625; 335/205–207; 307/118; 200/61.2, 61.45 R, 61.47, 61.52, 84 R, 84 C, 81.9 HG, 190, 303, 302.1; 361/377

[56] References Cited

U.S. PATENT DOCUMENTS

| | | |
|---|---|---|
| 3,269,685 | 8/1966 | Wallace . |
| 3,309,687 | 3/1967 | Phipps ........................ 340/625 |
| 3,564,171 | 2/1971 | Hammond .................. 200/84 C |
| 3,592,981 | 7/1971 | Rule . |
| 3,601,729 | 8/1971 | Hierta . |
| 3,659,064 | 4/1972 | Inoue . |
| 3,944,770 | 3/1976 | Pepper ........................ 200/84 R |
| 4,373,155 | 2/1983 | Dola . |
| 4,399,338 | 8/1983 | Jones ........................... 340/625 |
| 4,437,255 | 3/1984 | Reed ........................... 340/668 |
| 4,692,576 | 9/1987 | Frede ........................... 73/322.5 |
| 4,755,640 | 7/1988 | Cooley ........................ 200/84 R |

FOREIGN PATENT DOCUMENTS 1515729 12/1969 Fed. Rep. of Germany .
WO8202113 6/1982 PCT Int'l Appl. .

OTHER PUBLICATIONS

71/7984—South African Patent Application, Ser. No. 71/7984, filed 11/29/71, entitled "Electric Float Type Level Indicator".
Photocopies of Float Switch Sold Under Trademark "Matic".

*Primary Examiner*—Gerald P. Tolin
*Attorney, Agent, or Firm*—Harness, Dickey & Pierce

[57] ABSTRACT

A float switch includes a buoyant housing defining a non-linear guide path. Switch operating means is located displaceably under gravity within the guide path. The switch operating means is operable to activate switch means in at least one position along its path when the housing is tilted.

7 Claims, 3 Drawing Sheets

FLOAT SWITCH WITH BUOYANT HOUSING AND SWITCH OPERATING MEANS WITHIN THE HOUSING

This invention relates to a float switch.

According to the invention there is provided a float switch which includes a buoyant housing defining a non-linear guide path, and switch operating means located displaceably under gravity within the guide path, the switch operating means being operable to activate switch means in at least one position along its path when the housing is tilted.

The guide path is conveniently located within the housing but it may be provided externally of the housing. In a preferred embodiment, the guide path may be arcuately curved so that when the housing is tilted, the switch operating means is displaced gradually initially under gravity as it moves towards a high portion of the arcuate path and then moves suddenly along a downwardly inclined portion of the arcuate path. In another embodiment, the guide path may be V-shaped for the same purpose.

The guide path along which the operating means is displaceable may for example be in the form of a track extending at least partially between opposed inner walls of the housing. The track may be tubular or part circular in cross section. The operating means may then be in the form of a ball or the like arranged to roll or slide along the track when the housing is tilted. In another embodiment, the track may be rectangular in cross section and the operating means may be cylindrical and arranged to roll along the rectangular track.

In another embodiment, the operating means may be of magnetic material operable to activate switch means in the form of a reed switch when the operating means is displaced under gravity towards its operative position.

In another embodiment, the operating means may be in the form of a metallic object which at a particular position along the path is arranged to activate the switch means by inductive or capacitive coupling or to disturb the lines of current flow in a conductor by means of Hall effect.

In still a further embodiment, the operating means may be of an electrically conductive material and be arranged to bridge a pair of contacts thereby to close the switch means when the housing is tilted to a particular position. The electrically conductive material may be mercury.

In yet a further embodiment, the operating means may be of any material but of sufficient weight physically to operate the switch means which can then be in the form of a microswitch, mercury switch, or the like.

In another embodiment, the operating means may be arranged to interrupt a light beam, e.g. emitted from a light emitting diode, thereby to activate the switch means when the housing is tilted to a particular position.

In another embodiment, the operating means may be arranged to alter the frequency of an oscillator thereby to activate switch means when the housing is tilted.

When the housing is anchored by means of a flexible line or cord, the housing may include ballast to orientate the housing to a particular orientation while it is floating in a liquid medium. In another embodiment, the housing may be anchored by a rigid or semi-rigid arm. The float switch may have an overall density of about 0.5.

In a preferred form, the switch means is arranged to be activated whenever the housing is tilted through an angle of about 30 to 60 degrees from the horizontal.

The housing may be formed by an injection moulding process. It may be formed as a sphere in two halves. Each half may have portion of the guide path matingly formed therein and the two- halves may be subsequently joined together. Preferably however the one half portion has a recess formed therein and defining the guide track. The sphere may be coated with an external coating of teflon, a teflon copolymer, or the like. The coating may have a thickness of about 0.5 mm to provide resistance against chemical attack, such as by acids and the like. The switch means may be provided within the housing and be connected to an external source by electrical wiring which may be integrally covered with the coating. The electrical wiring may then serve as an anchor for the float switch. The electrical wiring may, if desired, have ballast thereon.

Various embodiments of the invention are now described by way of example with reference to the accompanying drawings in which FIG. 1 shows a schematic cross sectional view of one embodiment of a float switch in accordance with the invention;

Figure 1:
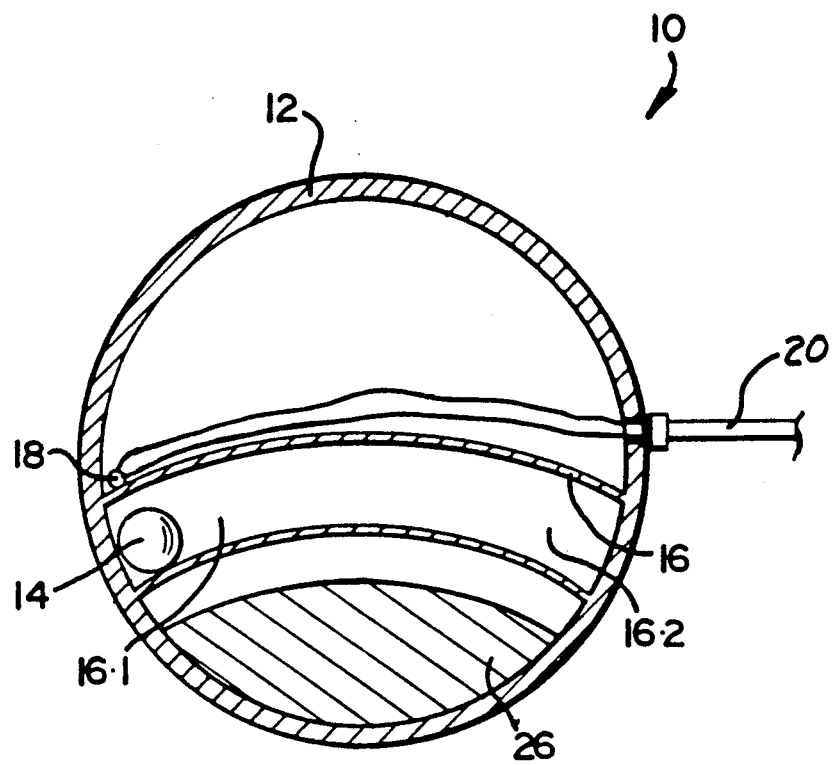

Referring to the drawings, reference numeral 10 generally indicates a float switch which includes a buoyant housing 12 preferably formed from a synthetic plastics material by an injection moulding process. The housing contains switch operating means which, in the FIG. 1 embodiment, is in the form of a ball 14 of magnetic material. When the housing 12 is tilted, the ball can roll or slide along an arcuate path defined by a tubular guide track 16 extending between opposed inner walls of the housing 12.

When the ball is displaced to the position shown in FIG. 1, it is in proximity to a reed switch 18 which is magnetically activated by the ball 14. The reed switch 18 is connected by a flexible line formed by wiring 20 to a remote source. The wiring 20 is used to anchor the housing 12 at a suitable position, e.g. within a tank or reservoir.

In the FIGS. 2 to 5 embodiment, the housing comprises two half portions 12.1 and 12.2. The portion 12.1 has an arcuate guide track 16 along which the operating means in the form of a magnetic disc or cylinder 14 can be displaced under gravity. A further recess 22 is defined in the portion 12.1 to accommodate electrical wiring (not shown) leading to a pair of reed switches 18 which when the portions 12.1 and 12.2 are joined together are accommodated in apertures 24 provided in the portion 12.2. The electrical wiring is taken out of the recess 22 via a recess 22.1 and when the half portions 12.1 and 12.2 are joined together, a teflon or similar coating (not shown) is applied to the outer surface of the housing 12 and simultaneously to the wiring outside of the housing to seal the housing and to provide protection against chemical attack. Prior to applying the coating, the two half portions 12.1 and 12.2 may be joined together by heat welding or by the use of bonding compounds.

Figure 2:
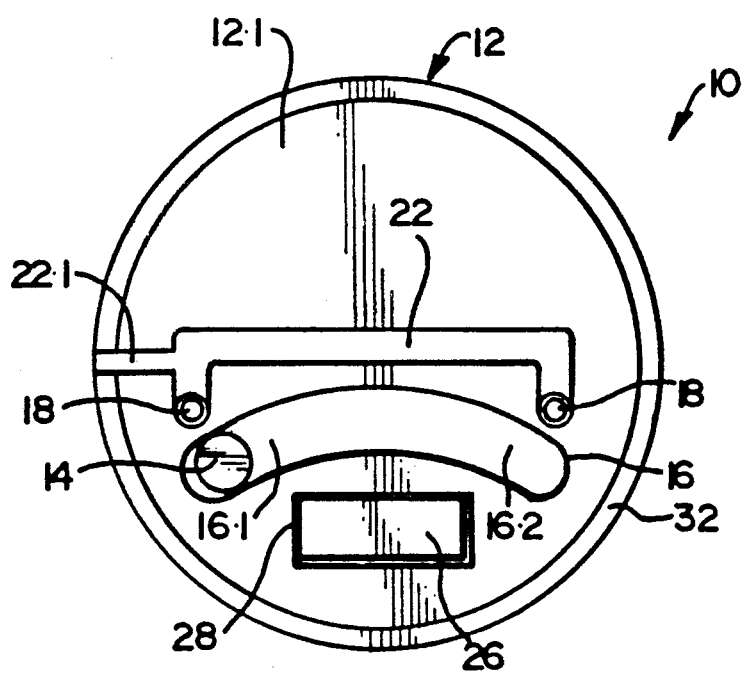
FIGS. 2 and 3 show respectively a front view and sectional side elevation of one half portion of a modified form of float switch.
Figure 3:
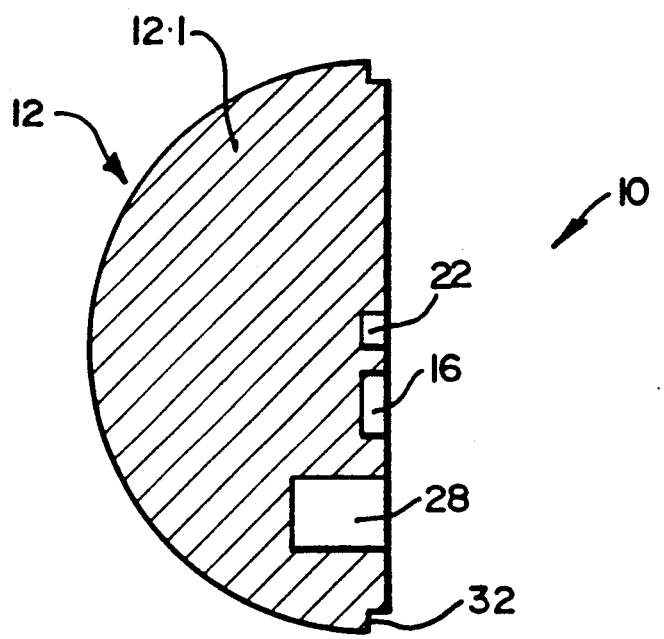
Figure 4:
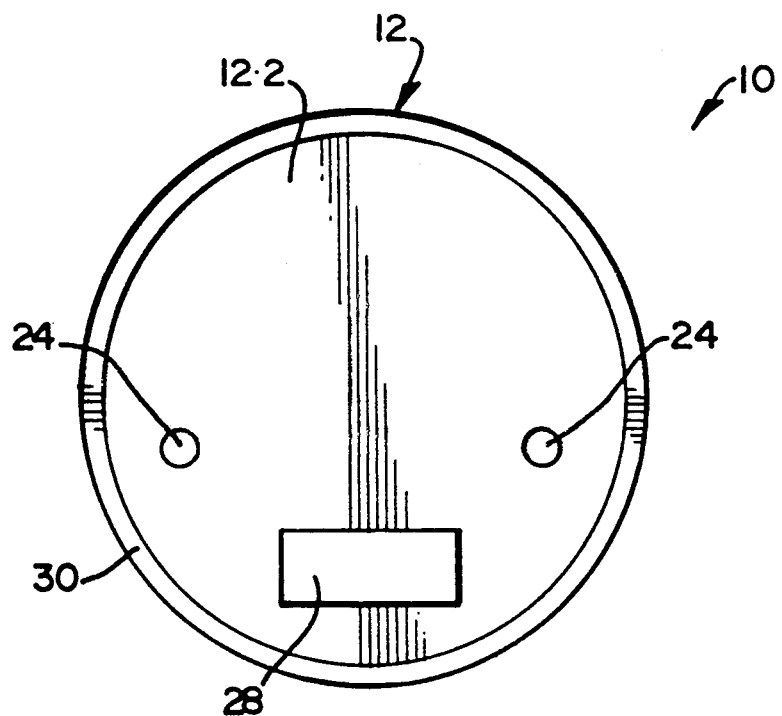
FIGS. 4 and 5 show views similar to FIGS. 2 and 3 of an opposite half portion of the float switch.
Figure 5:
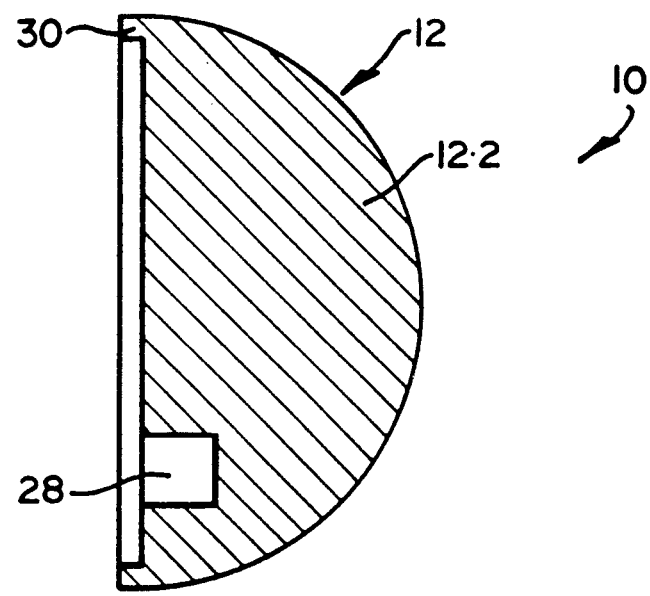

Ballast 26 which can be in the form of any suitable weight, e.g. of metal, is located in a lower portion of the housing 12 in the FIG. 1 embodiment and in a pair of opposed mating apertures 28 in the FIGS. 2 to 5 embodiment. The ballast 26 is, as shown, located at a position on either side of a vertical centre line of the housing 12, and below a horizontal centre line of the housing 12, to give the housing a low centre of gravity and to cause the housing to orientate itself in a substantially constant position (as illustrated in FIG. 2) while it floats upwardly and downwardly in a liquid medium. As a result, the housing will maintain its position, as illustrated, until the wiring 20 is fully extended and is taut, at which stage the wiring will cause the housing to tilt. The ballast 26 is selected so that the housing will have an overall density of about 0.5, i.e. the housing will float in the liquid medium so that about half its vertical height is submerged. Also in the FIGS. 2 to 5 embodiment, a ridge 30 is provided in the portion 12.2 and a mating peripheral recess 32 is provided in the portion 12.1 for accurate alignment of the two half portions 12.1 and 12.2.

Figure 6:
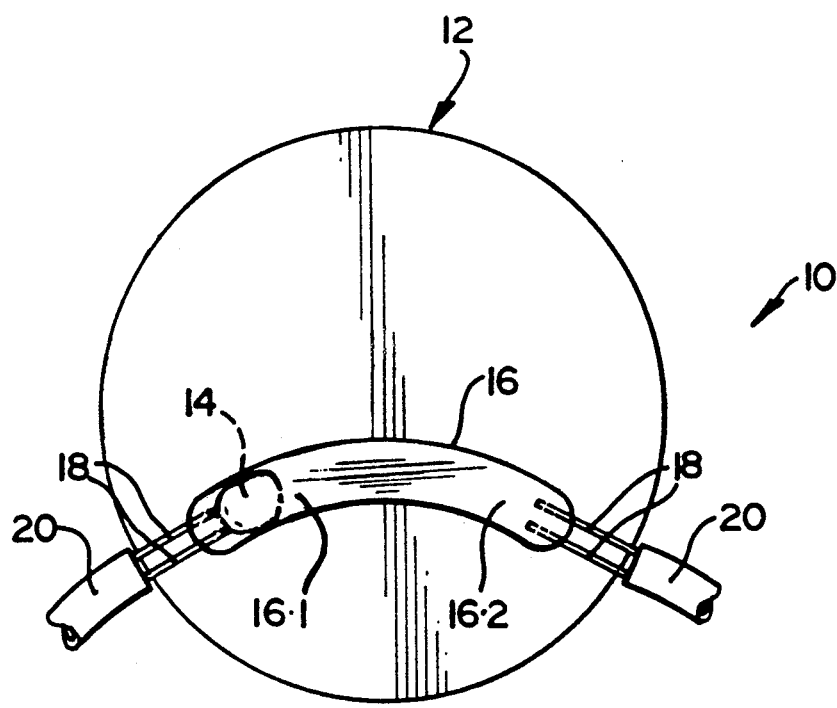
FIG. 6 shows a schematic cross sectional view of a further modification of the float switch.

In the FIG. 6 embodiment, an arrangement similar to the FIGS. 2 to 5 embodiment is shown except that a glass or similar envelope defines the guide track 16 and the track 16 contains a small quantity of mercury 14 which is capable of being displaced under gravity along the track 16. The switch means 18 is in the form of a pair of contacts protruding into the glass envelope at each end of the envelope. The mercury 14 then physically bridges the contacts 18 when the housing is tilted.

It will be appreciated that various modifications to the invention are possible as described broadly above.

The invention illustrated provides a float switch which can be inexpensively manufactured and which is of simple construction yet is robust. The float switch can be used for a number of applications, e.g. to control the level in a container, tank, or the like. It can also be used safely in an explosive environment by applying a low voltage, e.g. of 12 volts, along the wiring 20. It will further be appreciated that a number of switch means can be mounted at different positions along the path defined by the guide track 16, the various switch means being activatable at different orientations of the housing 12. The housing 12 at least in the FIGS. 2 to 5 embodiment is also resistant to chemical attack. The use of an arcuate guide track 16 causes the switch operating means 14 initially to move slowly along the upwardly inclined portion 16.1 of the track 16 and then when it reaches the central portion of the track suddenly to move along the downwardly inclined portion 16.2 to cause a quick switching action as the housing is tilted.

What I claim is:

1. A float switch which includes a buoyant housing defining an arcuately curved totally enclosed guide path of a constant radius of curvature, switch operating means located displaceably under gravity within the guide path, the switch operating means being operable to activate switch means in at least one position along its path when the housing is tilted, anchoring means pivotally anchoring said housing and including a flexible line, said flexible line being the only non-fluid support for said buoyant housing and the housing further including ballast means for orientating the housing to a generally predetermined orientation while the housing is floating in a liquid medium.

2. A float switch as claimed in claim 1, in which the guide path along which the operating means is displaceable is in the form of a track extending at least partially between opposed inner walls of the housing.

3. A float switch as claimed in claim 2, in which the track is tubular in cross section and the operating means is in the form of a ball arranged to roll or slide along the track when the housing is tilted.

4. A float switch as claimed in claim 1, in which the operating means is of magnetic material operable to activate switch means in the form of a reed switch when the operating means is displaced under gravity towards its operative position.

5. A float switch as claimed in claim 1, having an overall density of about 0.5.

6. A float switch as claimed in claim 1, in which the housing is in the form of an injection moulding comprising a substantially solid sphere in two halves, at least one half having a portion of the guide path formed therein and the two halves subsequently being joined together.

7. A float switch which includes a buoyant housing defining an arcuately curved guide path which is totally enclosed and which has a contant radius of curvature, switch operating means in the form of a disk of magnetic material located displaceably under gravity within the guide path, the disk being operable to activate switch means in the form of at least one reed switch located in at least one position in proximity to the guide path thereby to permit activation of the switch means by the disk when the housing is tilted, anchoring means pivotally anchoring the housing and including a flexible line, said flexible line being the only non-fluid support for said buoyant housing and the housing further including ballast means for orientating the housing to a generally predetermined orientation while the housing is floating in a liquid medium.

* * * * *